United States Patent
Vidunas (10) Patent No.: US 7,558,322 B2
(45) Date of Patent: Jul. 7, 2009

(54) METHOD AND APPARATUS FOR TEMPORAL WAVELET COMPRESSION

(76) Inventor: Joseph P. Vidunas, 807 Tan Gi Goot Dr., Aztec, NM (US) 87410

( * ) Notice: Subject to any disclaimer, the term of this patent is extended or adjusted under 35 U.S.C. 154(b) by 780 days.

(21) Appl. No.: 10/096,490

(22) Filed: Mar. 13, 2002

(65) Prior Publication Data

US 2002/0131505 A1    Sep. 19, 2002

Related U.S. Application Data

(60) Provisional application No. 60/275,113, filed on Mar. 13, 2001.

(51) Int. Cl.
*H04B 1/66* (2006.01)

(52) U.S. Cl. .............. 375/240.19; 375/240.25; 375/240.23; 375/240.24; 375/240.26; 382/233; 382/249; 382/246; 382/245; 382/235

(58) Field of Classification Search ........... 375/240.19, 375/240.26, 240.03, 240.23, 240.25, 240.24; 382/245, 246, 248, 249, 235, 233, 251
See application file for complete search history.

(56) References Cited

U.S. PATENT DOCUMENTS

| | | | | |
|---|---|---|---|---|
| 5,040,233 | A | * | 8/1991 | Davy et al. .................. 382/239 |
| 5,982,435 | A | * | 11/1999 | Tong et al. ............. 375/240.16 |
| 5,991,515 | A | * | 11/1999 | Fall et al. .................... 358/1.15 |
| 6,081,295 | A | * | 6/2000 | Adolph et al. .......... 375/240.03 |
| 6,101,284 | A | * | 8/2000 | Matsubara et al. .......... 382/260 |
| 6,195,024 | B1 | | 2/2001 | Fallon |
| 6,208,761 | B1 | * | 3/2001 | Passaggio et al. ............ 382/237 |
| 6,236,758 | B1 | * | 5/2001 | Sodagar et al. .............. 382/240 |

FOREIGN PATENT DOCUMENTS

| | | |
|---|---|---|
| EP | 0 627 858 A2 | 12/1994 |
| EP | 0 701 375 A2 | 3/1996 |
| WO | 97/03516 | 1/1997 |

OTHER PUBLICATIONS

Zatsman, et al., "Industry's First Integrated Wavelet Video Codec Sets New Standards for Cost, Image Quality and Flexibility", Analog Dialogue 30-2, 1996, pp. 7-9.

* cited by examiner

*Primary Examiner*—Shawn An (57) ABSTRACT

A system is described that comprises a method and apparatus for further compressing an already compressed data stream, using a mathematical exclusive-OR computation. The method comprises: receiving a data stream that has been compressed using a first compression protocol; decompressing the data stream using the first compression protocol; reducing temporal redundancy in the data stream using an exclusive-OR comparison protocol; and recompressing the data stream using the first compression protocol. The apparatus comprises: a decompression unit to receive and decompress a compressed data stream to produce decompressed data; an exclusive-OR comparison unit, coupled to the decompression unit, to perform a mathematical exclusive-OR operation on the decompressed data to produce resultant data; and a recompression unit to compress the resultant data to produce a further compressed data stream.

33 Claims, 5 Drawing Sheets

FIG. 1
(PRIOR ART)

METHOD AND APPARATUS FOR TEMPORAL WAVELET COMPRESSION

CROSS-REFERENCE TO RELATED APPLICATION(S)

This application is related to and claims priority to U.S. provisional application entitled TEMPORAL WAVELET COMPRESSION ALGORITHM having Ser. No. 60/275,113, by Joseph P. Vidunas, filed Mar. 13, 2001 and incorporated by reference herein.

BACKGROUND OF THE INVENTION

1. Field of the Invention

The present invention is directed to data compression and, more particularly to further compression of already compressed video.

2. Description of the Related Art

Image (e.g., video) data is often compressed or processed by using wavelet analysis. Wavelets are mathematical functions that can segment a digital signal into different frequency bands. Wavelets have some advantages over Fourier transforms, but are roughly analogous. Known compression systems convert raw image data into wavelet transform data, then run-length encode or Hoffman encode the data.

Lossy compression provides high degrees of compression and results in very small compressed files, but there is a certain amount of loss when they are restored (cf. lossless compression, which does not provide as high a degree of compression, but which does not result in any loss upon restoration). Wavelet compression is a lossy compression method used for color images and video. Instead of compressing small blocks of 8×8 pixels as in JPEG and MPEG compression methods, the wavelet algorithms compress the entire image with ratios of up to 300:1 for color and 50:1 for gray scale. An example of a codec that performs wavelet compression is the ADV601 from Analog Devices, Inc. of Norwood, Mass.

Figure 1:
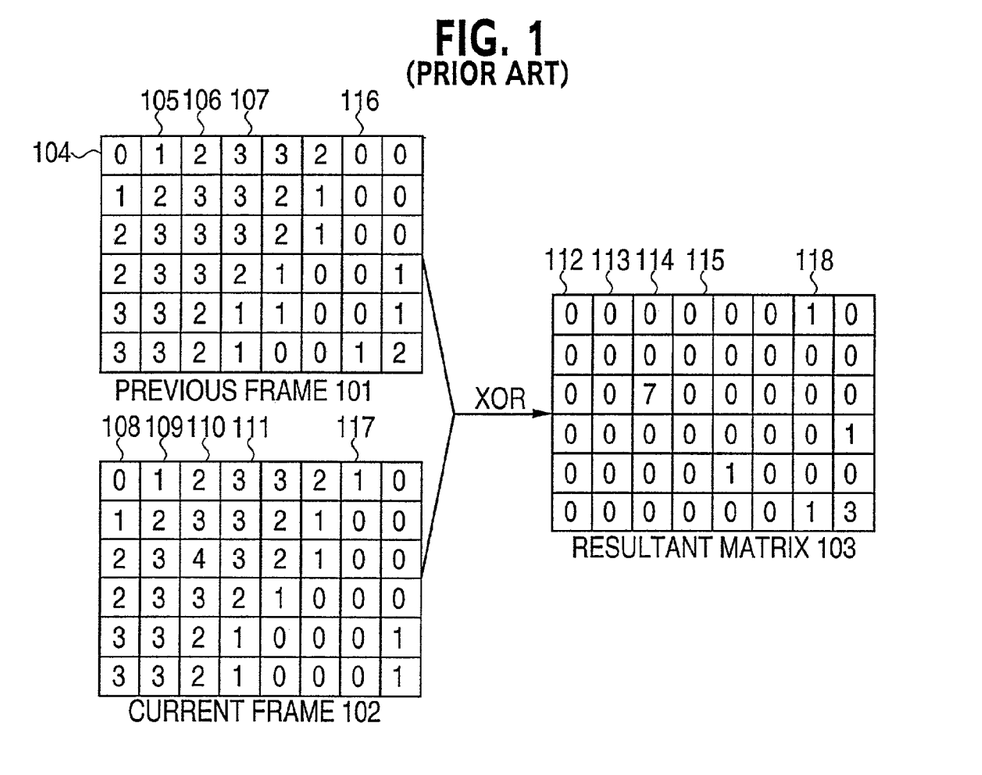
FIG. 1 is an example of a conventional exclusive-OR operation.

Another known way to compress video is by reducing temporal redundancy using an exclusive-OR (XOR) comparison, an example of which is illustrated in FIG. 1. In FIG. 1, previous frame 101 and current frame 102 are individual, successive frames within a video stream. Each cell of the matrices that form frames 101 and 102 in FIG. 1 (e.g., cells 104 to 111) represents a wavelet coefficient. Upon performing an XOR operation on frames 101 and 102, resultant matrix 103 is produced, which contains cells (e.g., 112-115) corresponding to the cells in the same position in frames 101 and 102, the contents of which are the result of an XOR operation on the corresponding cells in frames 101 and 102. For example, an XOR operation is performed on the contents of cells 104 and 108 which have a value of '0' to produce a '0' result in cell 112. The same result is produced in cells 113-115 when an XOR operation is performed on cells 105 and 109, 106 and 110, and 107 and 111, respectively, because the contents of the corresponding pairs of cells in frames 101 and 102 are identical. Upon performing an XOR operation on cells of frames 101 and 102 with differing contents, such as cells 116 and 117, which contain a '0' and '1,' respectively, a '1' results in box 118 of matrix 103.

XOR comparison is useful in video streams where each video frame image is usually the same (e.g., security cameras). XOR comparison can be used to dramatically reduce the size of the compressed file because each box of each frame is usually identical to the same box in a subsequent frame, and can therefore be compressed accordingly. However, it is not possible to perform XOR comparison after known wavelet compression of a video stream, like that performed by the ADV601, without reversing the run-length and Huffman encoding to obtain access to the wavelet coefficients.

SUMMARY OF THE INVENTION

It is an aspect of the present invention to provide a method and apparatus to perform a mathematical exclusive-OR operation on the wavelet data from sequential frames of a data stream at the quantized coefficient layer across each of the wavelet frequency bands. It is another aspect of the present invention to selectively apply the results of a mathematical exclusive-OR operation where the gain thereby is determined to be significant.

The above aspects can be attained by a method for further compressing an already compressed data stream, using a mathematical exclusive-OR computation by receiving a data stream that has been compressed using a first compression protocol; decompressing the data stream using the first compression protocol; reducing temporal redundancy in the data stream using an exclusive-OR comparison protocol; and recompressing the data stream using the first compression protocol.

The method can be performed by an apparatus having a decompression unit to receive and decompress a compressed data stream to produce decompressed data; an exclusive-OR comparison unit, coupled to the decompression unit, to perform a mathematical exclusive-OR operation on the decompressed data to produce resultant data; and a recompression unit to compress the resultant data to produce a further compressed data stream.

The decompression and recompression units may share components. For example, the decompression and recompression units may include an entropy (e.g. Huffman) encoding/decoding unit, to receive the compressed data stream and perform decompression to produce decompressed data and a run-length encoding/decoding unit, coupled with the entropy encoding/decoding unit to decode the decompressed data into quantized data that is supplied to the exclusive-OR comparison unit. The run-length encoding/decoding unit then compresses the resultant data from the exclusive-OR comparison unit to produce run-length encoded data, and the entropy encoding/decoding unit compresses the run-length encoded data to produce the further compressed data stream.

The aspects described above, together with other aspects and advantages that will be subsequently apparent, reside in the details of construction and operation as more fully hereinafter described and claimed, reference being made to the accompanying drawings forming a part hereof, wherein like numerals refer to like parts throughout.

DETAILED DESCRIPTION OF THE PREFERRED EMBODIMENTS

Temporal wavelet compression reduces the data rate of an intra-frame wavelet video stream by applying a mathematical exclusive-OR (XOR) operation on the wavelet data from sequential frames at the quantized wavelet coefficient layer across each of the wavelet frequency bands. This means the XOR operation is applied to all of the wavelet bands. The number of wavelet bands can vary in number depending on the intra-frame wavelet component. For example, an off-the-shelf compression ASIC, such as Analog Devices ADV601, used in an embodiment of the present invention (see the discussion of FIGS. 4 and 5, below) produces 42 wavelet frequency bands. There is no selection of particular wavelet bands, unless a frequency band threshold is used as described below (in regard to FIG. 4).

Figure 2:
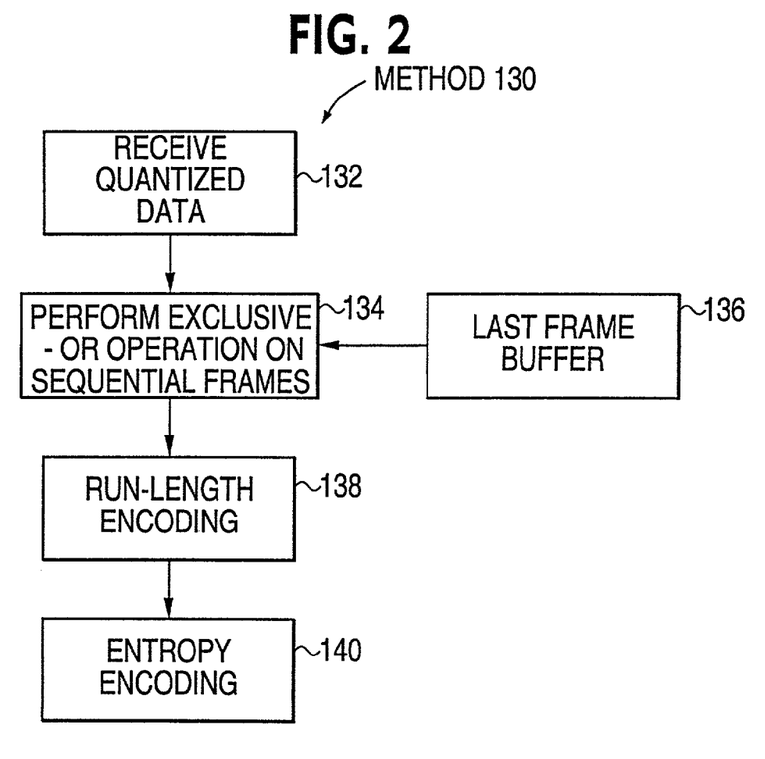
FIG. 2 is a flowchart of a method for temporal wavelet compression, according to embodiments of the present invention.

FIG. 2 is a flowchart of a method for temporal wavelet compression, according to embodiments of the present invention. Specifically, FIG. 2 illustrates method 130, which begins where quantized data is received 132. The result of the quantization in the intra-frame wavelet process is a matrix of wavelet coefficients rounded to distinct values either preconfigured or calculated by the intra-frame wavelet process. An XOR operation is then performed 134 on the quantized data. A last frame buffer simply holds 136 the wavelet coefficients from the last frame to provide a basis for an XOR comparison. The equation for the comparison is:

$$q_n[x, y, b] = q_n[x, y, b] \oplus q_{(n-1)}[x, y, b]$$

where n is the frame number and q is a quantized wavelet coefficient at a point determined by pixel locations x and y in the wavelet band corresponding to value b. The XOR operation was chosen for the comparison for the following reasons: (1) it results in a zero value if the coefficients in sequential frames are the same; (2) it will not overflow the double byte capacity of the wavelet coefficients; and (3) it is easily reversed in the decode operation by applying the exact same equation and (4) XOR can be calculated by Pentium II class processors in only one clock cycle.

Application of temporal wavelet compression produces a temporal wavelet frame in which the quantized value at a particular band, horizontal, and vertical position is equal to the result of an XOR operation between itself and the corresponding value in the previous frame. Since the quantized wavelet coefficients are very similar from frame to frame in the average security video scene, the mathematical XOR operation will result in a zero value in more than 98% of the operations. Conventional run-length encoding is then applied 138 to these primarily zero values to produce a significant data reduction from the original frame. Further, the data is entropy encoded 140.

Figure 3:
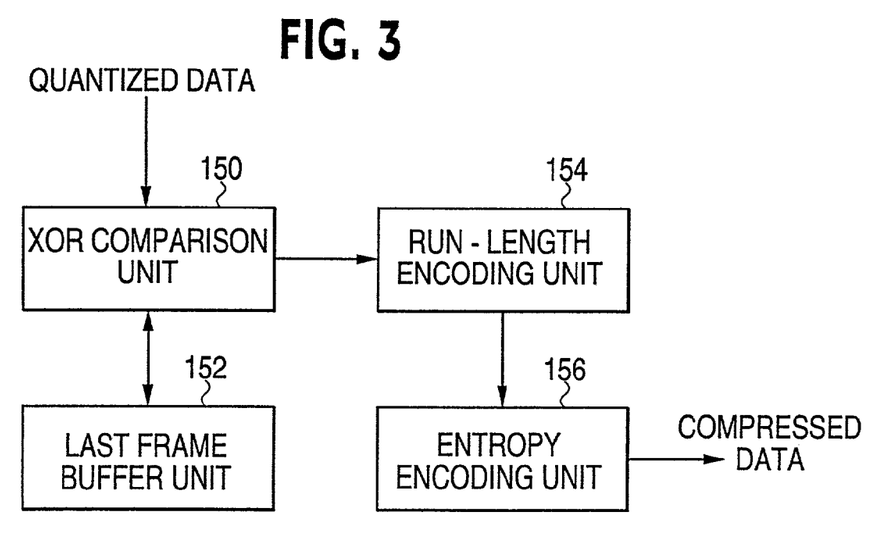
FIG. 3 is a block diagram of an apparatus for temporal wavelet compression, according to embodiments of the present invention.

FIG. 3 is a block diagram of an apparatus for temporal wavelet compression, according to embodiments of the present invention. Specifically, FIG. 3 illustrates XOR comparison unit 150, which is coupled to receive quantized data. In an embodiment, XOR comparison unit 150 performs the XOR operation described above. Last frame buffer 152 holds the wavelet coefficients from the last frame to provide a basis for an XOR comparison. Run-length encoding unit 154 is coupled with XOR compression unit 150, and encodes the XOR-compressed data. Entropy encoding unit 156 is coupled with run-length encoding unit 154, and encodes the run-length encoded data. In an embodiment, entropy encoding unit 156 is a Huffman encoding unit. The run-length and entropy encoding can be performed according to conventional protocols.

Figure 4:
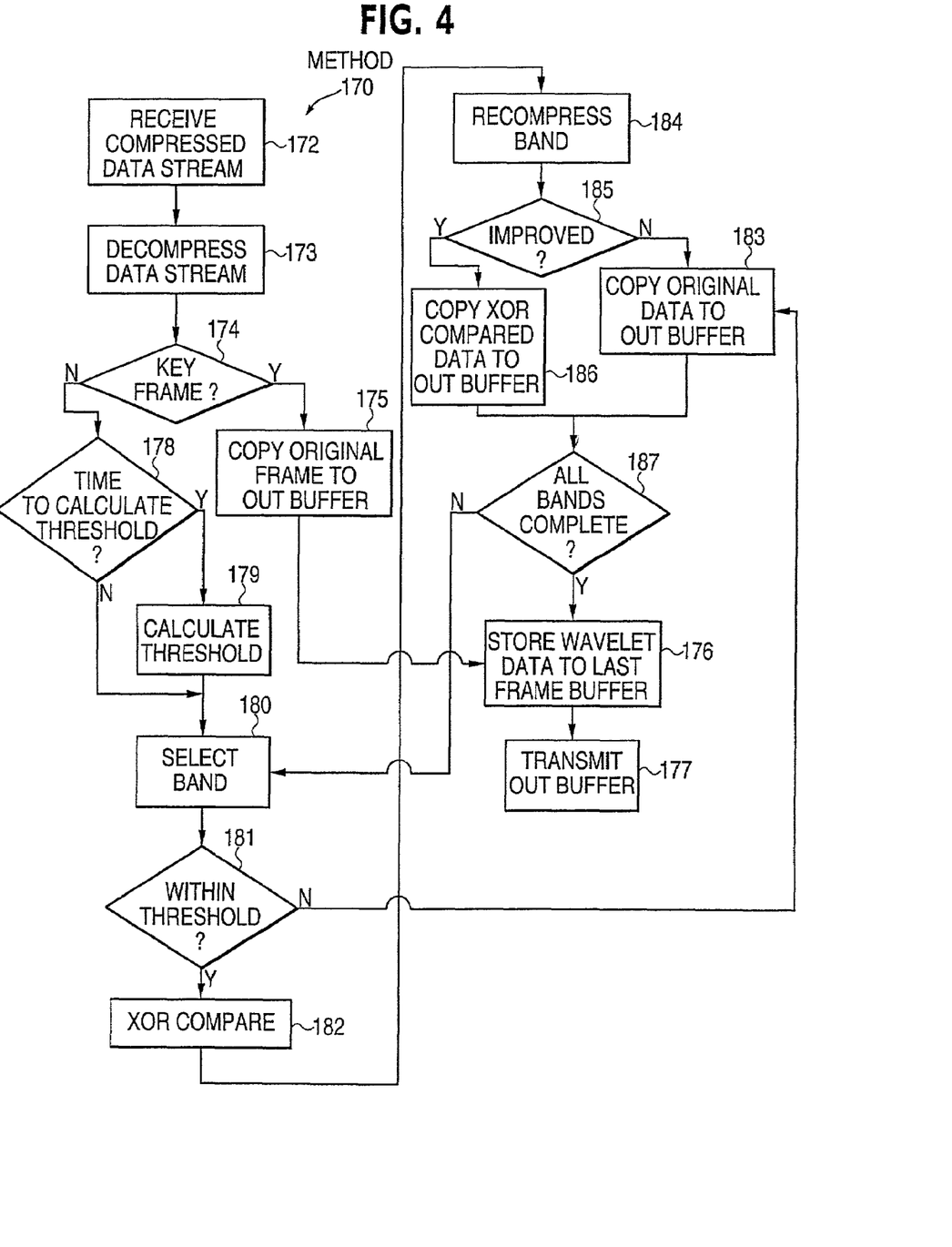
FIG. 4 is a flowchart of a method for temporal wavelet compression after a data stream has already been compressed by an ASIC for wavelet compression, according to embodiments of the present invention.

FIG. 4 is a flowchart of a method for temporal wavelet compression after a data stream has already been compressed by an ASIC for wavelet compression, according to embodiments of the present invention. Specifically, FIG. 4 illustrates method 170, which begins where a compressed data stream is received 172. In an embodiment, the compressed data stream is received from a compression application-specific integrated circuit (compression ASIC) (e.g., an ADV601), and is a compressed video stream from a security camera. In this embodiment, the video stream is compressed using run-length encoding and entropy encoding. The data stream is then decompressed 173, which, in the embodiment just described, involves reversing the run-length and entropy encoding. A check is made to determine whether a key frame is the current frame received 174. If so, the original frame is copied to an out buffer 175, the wavelet data is stored to a last frame buffer 176, and the out buffer is transmitted 177. If not, a check with outside conditions is made to determine whether to recalculate the frequency band compression threshold 178 to determine at what point wavelet frequency bands should be skipped, where the skipped frequency bands have already been compressed enough using the first compression protocol. A threshold is either recalculated 179 or left at is existing value.

A frequency band is selected 180, and then is checked to determine whether the current frequency band is within the threshold 181. If not, the original data is copied to the out buffer 183 (and the method continues as indicated in FIG. 4). If so, a XOR operation is performed using the wavelet coefficient data for the current frequency band from the current frame and the previous frame 182. The frequency band is then recompressed 184 using the same compression protocol as was used when received, e.g., run-time and entropy encoding. Raw data after quantization is generally zero in 60% to 80% of the coefficients. After the additional inter-frame XOR comparison, the percentage increases to between 90% and 99%.

A check is then made to determine whether the XOR-resultant data is further compressed over the received data stream 185. If so, the XOR-resultant data is copied to the out buffer 186. If not, the original data is copied to the out buffer 183.

A check is made to determine whether all frequency bands are complete 187. If not, another band is selected 180 (and the method continues as indicated in FIG. 4). If so, the wavelet data is stored to a last frame buffer 176, and the out buffer is transmitted 177. In an embodiment, the result of method 170 is transmitted. In an embodiment, the result of method 170 is stored.

As noted above, off-the-shelf components, which may include compression ASIC such as an ADV601, are used in the present implementation to perform the conventional intra-frame wavelet compression. Since these components completely encode the data, the run-length and entropy encoding are reversed to obtain quantized data for temporal wavelet compression. The present invention takes advantage of knowing the results of the conventional intra-frame wavelet compression to make a determination of how well each wavelet band has been compressed in the run-length and entropy encoding steps. A ratio of the size of the encoded data to the raw quantized data is compared to a frequency band compression threshold to determine if the particular band is already so small that it would be a waste to attempt to compress it any further. The threshold value can be scaled between a useful range of about 1-30% to maximize compression or minimize processor usage.

The frequency band compression threshold parameter allows the algorithm to be applied selectively to the bands where the highest data rates are found. This allows scaling the compression to minimize data rate or processor utilization depending on the operational environment.

Applying the Temporal Wavelet Algorithm to the intra-frame wavelet stream produces a greatly reduced data rate. In a test of average sample data, this reduction was on the order of 40-60%. The mathematical XOR comparison is very simple and is relatively easy to accomplish using only software and existing processors. Using highly optimized software code, this algorithm can be applied to QCIF wavelet frames at an average rate over 100 frames per second on Pentium II class processors. The frequency band compression threshold parameter allows the algorithm to be applied selectively to the bands where the highest data rates are found. This allows scaling the compression to minimize data rate or processor utilization depending on the operational environment.

Alternative embodiments include using an intra-frame wavelet stream with no temporal data reduction, using some other temporal reduction involving perhaps motion estimation, or using another common temporal compression scheme like the MPEG varieties.

Figure 5:
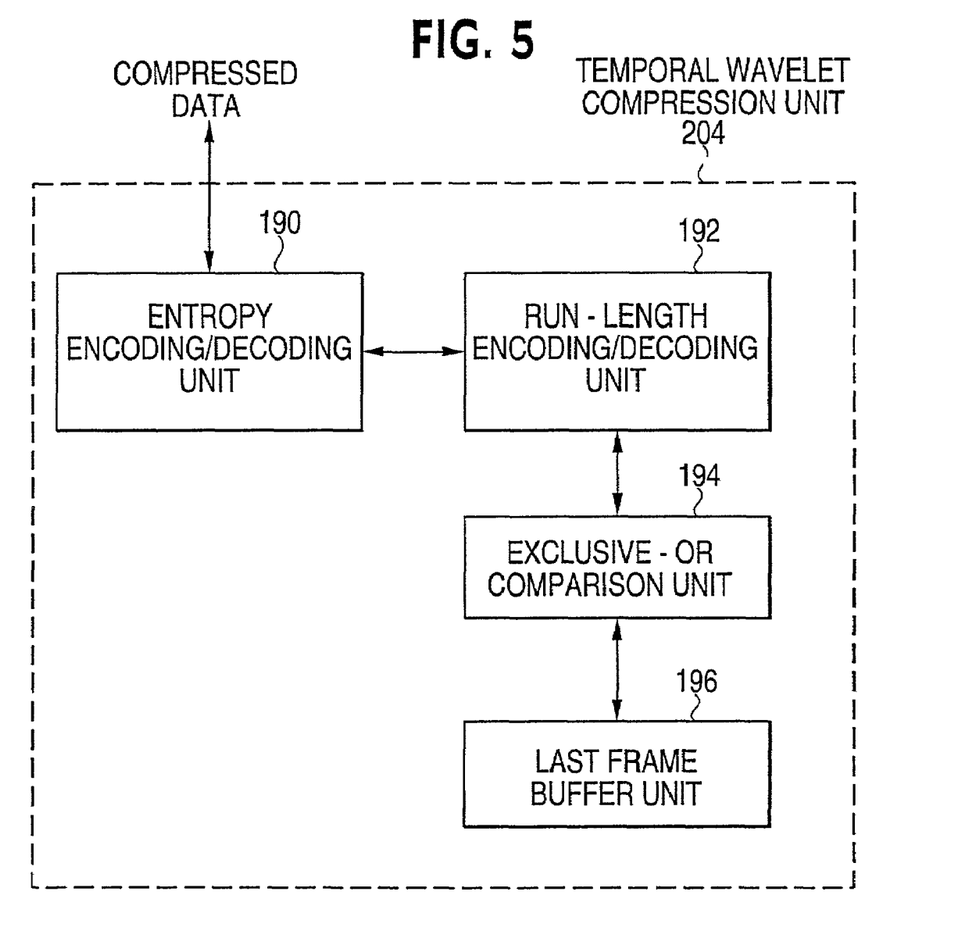
FIG. 5 is a block diagram of an apparatus for temporal waveform compression after a data stream has already been compressed by an ASIC for wavelet compression, according to embodiments of the present invention.

FIG. 5 is a block diagram of an apparatus for temporal wavelet compression after a data stream has already been compressed by an analog device for temporal wavelet compression, according to an embodiment of the present invention. Specifically, FIG. 5 illustrates temporal wavelet compression unit 204 (illustrated using dashed lines), which comprises entropy encoding/decoding unit 190, run-length encoding/decoding unit 192, exclusive-OR compression unit 194, and last frame buffer unit 196. Entropy encoding/decoding unit 190 is coupled to unillustrated components to send and receive compressed data, and encodes run-length encoded data or decodes entropy encoded data. Run-length encoding/decoding unit 192 is coupled with entropy encoding/decoding unit 190, and encodes XOR compared data or decodes run-length encoded data. Exclusive-OR comparison unit 194 is coupled with run-length encoding/decoding unit 192, and performs XOR comparison on a data stream. Last frame buffer unit 196 holds the wavelet coefficients for the previously processed frame to provide a basis for the XOR comparison. The apparatus illustrated in FIG. 5 is capable of further compressing already compressed data received from a compression ASIC by reducing temporally redundant data from the data stream. In an embodiment, entropy encoding/decoding unit 190 is a Huffman encoder/decoder.

Figure 6:
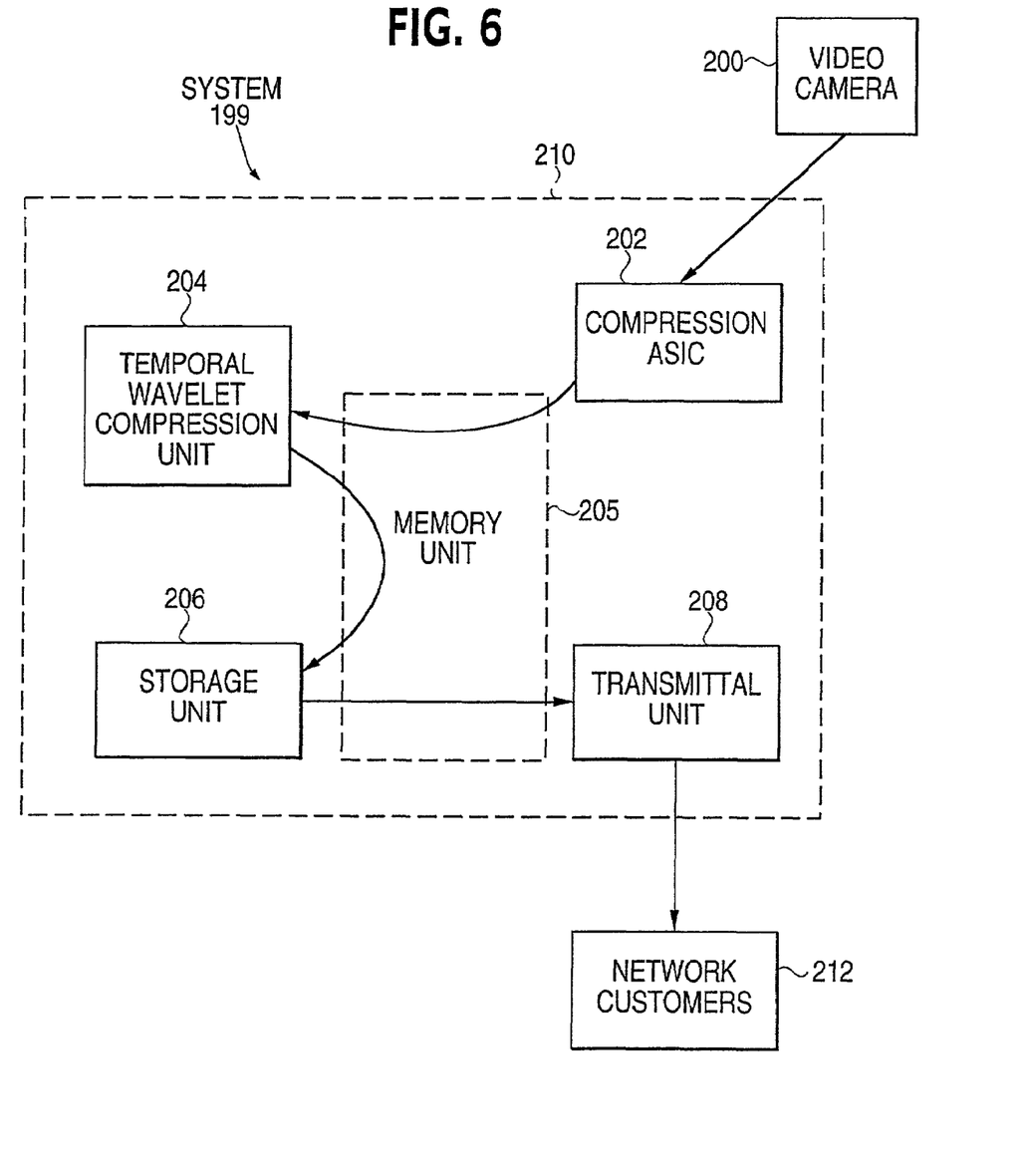
FIG. 6 is a block diagram of a video system with a temporal wavelet compression unit, according to embodiments of the present invention.

Embodiments of the present invention may also be incorporated into a system. FIG. 6 is a block diagram of a video system with a temporal waveform compression unit, according to embodiments of the present invention. Specifically, FIG. 6 illustrates system 199, in which comprises video camera 200 is connected to compression ASIC 202; compression ASIC 202 is connected to temporal wavelet compression unit 204 (in an embodiment, via memory unit 205 as described below); temporal wavelet compression unit 204 is connected to storage unit 206 (in an embodiment, via memory unit 205 as described below); storage unit 206 is connected to transmittal unit 208 (in an embodiment, via memory unit 205 as described below); and transmittal unit 208 is connected to a network (not shown) for transmission of compressed data to network customers 212.

In an embodiment, video camera 200 is a security camera. In an embodiment, compression ASIC 202 is an ADV601 as previously described above. In an embodiment, storage unit 206 is an online IDE hard drive. In an embodiment, transmittal unit 208 is a network interface. In an embodiment, system 199 also comprises memory unit 205, which can be PC SDRAM chips. In an embodiment, system 199 also comprises digital recorder 210 (illustrated in FIG. 6 using dashed lines), which comprises compression ASIC 202, temporal wavelet compression unit 204, storage unit 206, transmittal unit 208, and memory unit 205 (if included in system 199).

In an embodiment, system 199 is capable of generating a video signal, compressing it using entropy and run-length encoding, decompressing it using the same protocols, performing an XOR operation to compress the data, recompressing the XOR-compared data using entropy and run-length protocols, and storing or transmitting the compressed data. The XOR and entropy/run-length encoded data stream is smaller than without the XOR comparison.

The chipset included in the system includes memories, processors, and/or ASICs. Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, machine-readable media include read only memory (ROM), random access memory (RAM), magnetic disk storage media; optical storage media, flash memory devices, electrical, optical, acoustical, or other form of propagated signals (e.g., carrier waves, infrared signals, digital signals, etc.), etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for further compressing a compressed data stream using a temporal wavelet compression unit, the method comprising:

in a decompression unit, receiving a data stream that has been compressed using a first compression protocol;

in the decompression unit, partially decompressing the data stream using the first compression protocol to obtain wavelet coefficients;

in an exclusive-OR comparison unit, reducing temporal redundancy in the data stream using an exclusive-OR comparison protocol on the wavelet coefficients, where the exclusive-OR comparison protocol includes for each frame in the data stream that is not a key frame:

determining whether to initialize a frequency band compression threshold, wherein the threshold is to indicate at what point wavelet frequency bands should be skipped, where the skipped frequency bands have already been compressed enough using the first compression protocol; and determining whether a first wavelet frequency band is within the threshold, and if so, performing a mathematical exclusive-OR operation on the wavelet data at a quantized wavelet coefficient layer across the first wavelet frequency band; and in a recompression unit, recompressing the data stream using the first compression protocol.

2. The method as recited in claim 1, further comprising transmitting the data stream after said recompressing.

3. The method as recited in claim 1, further comprising storing the data stream after said recompressing.

4. The method as recited in claim 1, wherein the data stream is received as a compressed signal from a security camera.

5. The method as recited in claim 1, wherein the first compression protocol includes run-length encoding and entropy encoding of quantized data.

6. The method as recited in claim 5, wherein the entropy encoding is Huffman encoding.

7. The method as recited in claim 1, wherein the data stream is received from a compression ASIC.

8. The method as recited in claim 7, wherein the compression ASIC is an ADV601.

9. The method as recited in claim 1, wherein the exclusive-OR operation is:

$qn[x,y,b]=qn[x,y,b] \oplus q(n-1)[x,y,b]$, wherein n is the frame number and q is a quantized wavelet coefficient at a point determined by pixel locations x and y in the wavelet band corresponding to value b.

10. The method as recited in claim 1, further comprising:

determining whether a recompressed data stream resulting from said recompressing is further compressed than the received data stream; and discarding the recompressed data stream if it is not further compressed than the received data stream.

11. An apparatus to further compress a compressed data stream, comprising:

means for receiving a data stream that has been compressed using a first compression protocol;

means for partially decompressing the data stream using the first compression protocol to obtain wavelet coefficients;

means for reducing temporal redundancy in the data stream using an exclusive-OR comparison protocol on the wavelet coefficients, where said means for reducing temporal redundancy includes for each frame in the data stream that is not a key frame:

means for determining whether to initialize a frequency band compression threshold, wherein the threshold is to indicate at what point wavelet frequency bands should be skipped, where the skipped frequency bands have already been compressed enough using the first compression protocol;

means for determining whether a first wavelet frequency band is within the threshold; and means for performing a mathematical exclusive-OR operation on the wavelet data at a quantized wavelet coefficient layer across the first wavelet frequency band, when the first wavelet frequency band is within the threshold; and means for recompressing the data stream using the first compression protocol.

12. The apparatus as recited in claim 11, further comprising means for transmitting the data stream after recompressing by said recompressing means.

13. The apparatus as recited in claim 11, further comprising means for storing the data stream.

14. The apparatus as recited in claim 11, wherein said receiving means receives the data stream as a compressed signal from a security camera.

15. The apparatus as recited in claim 11, wherein the first compression protocol includes a run-length encoding and an entropy encoding of quantized data.

16. The apparatus as recited in claim 15, wherein the entropy encoding is Huffman encoding.

17. The apparatus as recited in claim 11, wherein the data stream is received from a compression ASIC.

18. The apparatus as recited in claim 17, wherein the compression ASIC is an ADV601.

19. The apparatus as recited in claim 11, wherein said means for performing the mathematical exclusive-OR operation comprises:

means for calculating $qn[x,y,b]=qn[x,y,b] \oplus q(n-1)[x,y,b]$, where n is the frame number, and q is a quantized wavelet coefficient at a point determined by pixel locations x and y in the wavelet band corresponding to value b.

20. The apparatus as recited in claim 11, further comprising:

means for determining whether a recompressed data stream resulting from said recompressing is further compressed than the received data stream; and means for discarding the recompressed data stream if it is not further compressed than the received data stream.

21. An apparatus to further compress a compressed data stream, comprising:

a decompression unit to receive and partially decompress the compressed data stream to produce decompressed data of wavelet coefficients;

an exclusive-OR comparison unit, coupled to the decompression unit, to perform a mathematical exclusive-OR operation on the decompressed data of wavelet coefficients to reduce temporal redundancy in the compressed data stream, where the exclusive-OR comparison unit, for each frame in the compressed data stream that is not a key frame:

determines whether to initialize a frequency band compression threshold, wherein the threshold is to indicate at what point wavelet frequency bands should be skipped, where the skipped frequency bands have already been compressed enough;

determines whether a first wavelet frequency band is within the threshold; and when the first wavelet frequency band is within the threshold, performs the mathematical exclusive-OR operation on the wavelet data at a quantized wavelet coefficient layer across the first wavelet frequency band to produce resultant data; and a recompression unit to compress the resultant data to produce a further compressed data stream.

22. The apparatus as recited in claim 21, wherein said decompression unit comprises:

an entropy encoding/decoding unit, to receive the compressed data stream and to decode the compressed data stream to produce decoded data; and a run-length encoding/decoding unit, coupled to said entropy encoding/decoding unit and said exclusive-OR comparison unit, to further decode the decoded data into quantized data supplied to said exclusive-OR comparison unit as the decompressed data.

23. The apparatus as recited in claim 22, wherein the entropy encoding/decoding unit is a Huffman entropy encoder/decoder.

24. The apparatus as recited in claim 22, wherein said recompression unit shares said entropy encoding/decoding and run-length encoding/decoding units with said decompression unit by
    said run-length encoding/decoding unit encoding the resultant data after said exclusive-OR comparison unit processes the quantized data, to produce encoded data, and
    said entropy encoding/decoding unit compressing the encoded data to produce the further compressed data.

25. The apparatus as recited in claim 21,
    wherein said exclusive-OR comparison unit performs the exclusive-OR operation by: calculating $qn[x,y,b]=qn[x,y,b] \oplus q(n-1)[x,y,b]$, where n is the frame number, and where q is a quantized wavelet coefficient at a point determined by pixel locations x and y in the wavelet band corresponding to value b.

26. The apparatus as recited in claim 21, wherein said decompression unit is further coupled to a compression ASIC to receive the compressed data stream.

27. The apparatus as recited in claim 26, wherein the compression ASIC is an ADV601.

28. The apparatus as recited in claim 21, further comprising a last frame buffer unit, coupled to said exclusive-OR comparison unit, to store the previous frame data.

29. A system to create and compress video data, comprising:
    a video unit to create video data;
    a compression ASIC, coupled to said video camera, to compress the video data using a first compression protocol;
    a temporal wavelet compression unit, coupled to said compression ASIC, to partially decompress the video data into reconstituted video of wavelet coefficients, to reduce temporal redundancy in the reconstituted video using an exclusive-OR comparison protocol on the wavelet coefficients, where the exclusive-OR comparison protocol includes for each frame in the video data that is not a key frame:
        determining whether to initialize a frequency band compression threshold, wherein the threshold is to indicate at what point wavelet frequency bands should be skipped, where the skipped frequency bands have already been compressed enough using the first compression protocol; and
        determining whether a first wavelet frequency band is within the threshold, and if so, performing a mathematical exclusive-OR operation on the wavelet data at a quantized wavelet coefficient layer across the first wavelet frequency band; and
    the temporal wavelet compression unit to recompress the reconstituted and temporally reduced video using the first compression protocol to produce further compressed video data; and
    a storage unit, coupled to said temporal wavelet compression unit, to store the further compressed video data.

30. The system as recited in claim 29, wherein said system is connectable to a network, and wherein said system further comprises a network interface coupled to said storage unit and the network, to transmit the further compressed video data over the network.

31. The system as recited in claim 29, wherein the first compression protocol includes run-length encoding and entropy encoding of quantized data.

32. The system as recited in claim 31, wherein the entropy encoding is Huffman encoding.

33. The system as recited in claim 29, wherein the compression ASIC is an ADV601.

* * * * *